US012440926B2

(12) United States Patent
Donke et al.

(10) Patent No.: US 12,440,926 B2
(45) Date of Patent: Oct. 14, 2025

(54) METHOD AND LASER MACHINING SYSTEM FOR ANALYZING A WELD SEAM FORMED BY A LASER WELDING PROCESS

(71) Applicant: Precitec GmbH & Co. KG, Gaggenau (DE)

(72) Inventors: Alexis Donke, Pforzheim (DE); Thorsten Lorenz, Iffezheim (DE); Jonas Nolte, Karlsruhe (DE); Wei Quang Duong, Rastatt (DE); Sascha Grau, Karlsruhe (DE); Simon Hähle, Gaggenau (DE); Rüdiger Moser, Malsch (DE); Stefan Birmanns, Rheinau (CH); Jens Reiser, Rheinstetten (DE)

(73) Assignee: Precitec GmbH & Co. KG, Gaggenau (DE)

( * ) Notice: Subject to any disclaimer, the term of this patent is extended or adjusted under 35 U.S.C. 154(b) by 496 days.

(21) Appl. No.: 17/671,743

(22) Filed: Feb. 15, 2022

(65) Prior Publication Data

US 2022/0258286 A1 Aug. 18, 2022

(30) Foreign Application Priority Data

Feb. 18, 2021 (DE) .......................... 102021103881.2

(51) Int. Cl.
*B23K 31/12* (2006.01)
*B23K 26/03* (2006.01)
(Continued)

(52) U.S. Cl.
CPC .......... *B23K 31/125* (2013.01); *B23K 26/032* (2013.01); *B23K 26/0622* (2015.10);
(Continued)

(58) Field of Classification Search
CPC .............. B23K 31/125; B23K 2101/36; B23K 2103/10; B23K 2103/12; B23K 26/032;
(Continued)

(56) References Cited

U.S. PATENT DOCUMENTS 5,674,415 A * 10/1997 Leong ................. B23K 26/044
219/121.64
5,681,490 A * 10/1997 Chang ................. B23K 26/032
219/121.64
(Continued)

FOREIGN PATENT DOCUMENTS

JP 2002-346776 A 12/2002
JP 2008-279497 A 11/2008
(Continued)

*Primary Examiner* — Kristina M Deherrera
*Assistant Examiner* — Julia Fitzpatrick
(74) *Attorney, Agent, or Firm* — DINSMORE & SHOHL LLP

(57) ABSTRACT

A method for analyzing a weld seam formed by a laser welding process includes thermally exciting the weld seam by radiating at least one laser pulse onto the weld seam, acquiring a decay characteristic of a thermal radiation emitted by the weld seam, and determining whether a welding defect is present based on an evaluation of the acquired decay characteristic.

16 Claims, 9 Drawing Sheets

(51) Int. Cl.

| | |
|---|---|
| *B23K 26/0622* | (2014.01) |
| *B23K 26/24* | (2014.01) |
| *B23K 26/322* | (2014.01) |
| *B23K 26/323* | (2014.01) |
| *B23K 101/36* | (2006.01) |
| *B23K 103/10* | (2006.01) |
| *B23K 103/12* | (2006.01) |
| *G01N 25/18* | (2006.01) |
| *G01N 25/72* | (2006.01) |
| *G01N 33/2045* | (2019.01) |
| *G01N 33/207* | (2019.01) |
| *H01M 50/566* | (2021.01) |

(52) U.S. Cl.
CPC ............ *B23K 26/24* (2013.01); *B23K 26/322* (2013.01); *B23K 26/323* (2015.10); *G01N 25/18* (2013.01); *G01N 25/72* (2013.01); *G01N 33/2045* (2019.01); *G01N 33/207* (2019.01); *H01M 50/566* (2021.01); *B23K 2101/36* (2018.08); *B23K 2103/10* (2018.08); *B23K 2103/12* (2018.08)

(58) Field of Classification Search
CPC .. B23K 26/0622; B23K 26/24; B23K 26/322; B23K 26/323; G01N 25/18; G01N 25/72; G01N 33/2045; G01N 33/207; H01M 50/566

See application file for complete search history.

(56) References Cited

U.S. PATENT DOCUMENTS

| | | | |
|---|---|---|---|
| 8,541,746 | B2 | 9/2013 | Andres et al. |
| 2004/0032597 | A1* | 2/2004 | Esmiller ............ B23K 26/242 356/636 |
| 2006/0249487 | A1 | 11/2006 | Dunias et al. |
| 2013/0178952 | A1 | 7/2013 | Wersborg et al. |

FOREIGN PATENT DOCUMENTS

| | | | |
|---|---|---|---|
| JP | 2012-006036 A | 1/2012 | |
| JP | 2013122414 A | * 6/2013 | ............ G01N 25/72 |
| WO | 2015045751 A1 | 4/2015 | |

* cited by examiner

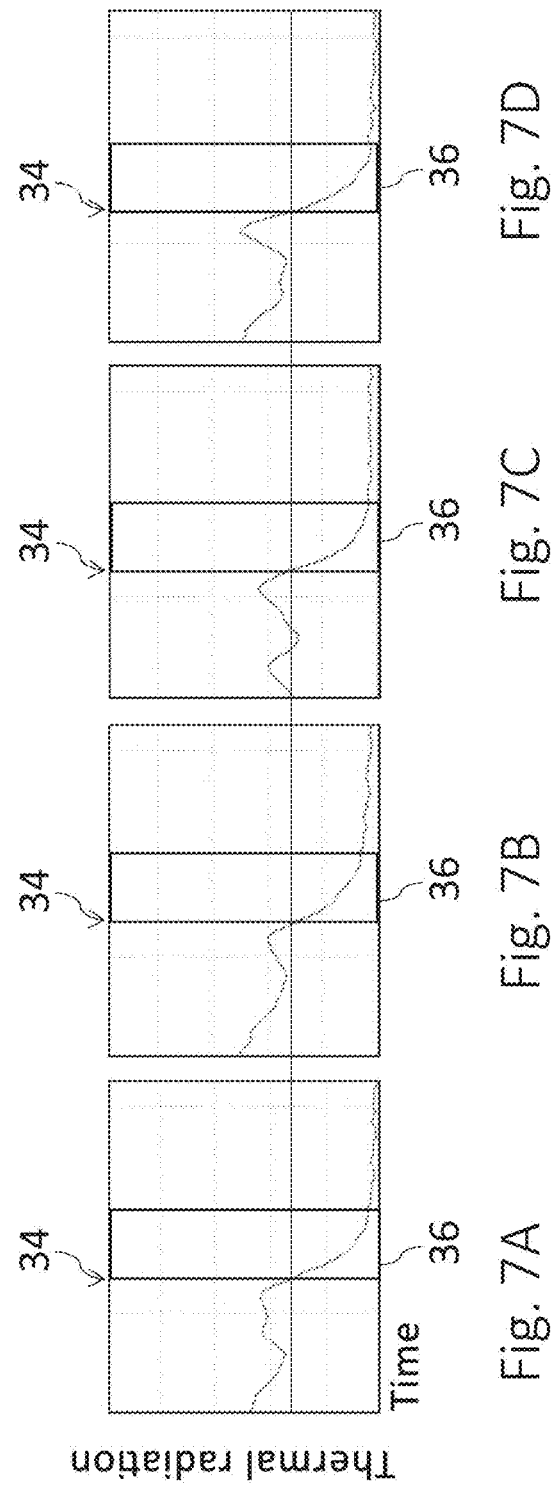

METHOD AND LASER MACHINING SYSTEM FOR ANALYZING A WELD SEAM FORMED BY A LASER WELDING PROCESS

CROSS-REFERENCE TO RELATED APPLICATIONS

This application claims priority to German application number 10 2021 103 881.2 filed Feb. 18, 2021, the disclosure of which is hereby incorporated by reference in its entirety.

FIELD OF THE INVENTION

The present invention relates to a method for analyzing a weld seam formed by a laser welding process and a laser machining system for machining a workpiece by means of a laser beam, the system being configured to carry out a method for analyzing a weld seam formed by a laser welding process.

BACKGROUND OF THE INVENTION

In a laser machining system for machining a workpiece by means of a laser beam, the laser beam emerging from a laser light source or an end of a laser optical fiber is focused onto the workpiece to be machined using beam guiding and focusing optics in order to locally heat the workpiece to melting temperature. Machining may comprise laser welding, for example. The laser machining system may include a laser machining head, in particular a laser welding head.

In order to ensure the machining quality, it is necessary to analyze and inspect the result of laser welding, in particular a weld connection between welded workpieces. The weld connection may designate the mechanical connection or the electrical connection between the welded workpieces, also called bonding or contact. In laser welding, typically a weld seam is formed, which is also referred to as a contact seam and forms the weld connection between the welded workpieces. The analysis of the weld connection or the weld seam includes the detection of welding defects. When laser welding workpieces, the detection of welding defects is a major challenge. Especially in the case of sheets in lap or parallel joints, a purely visual inspection of the weld seam from a top view typically does not reveal whether and which welding defect is present.

Batteries play a central role in the field of electromobility. Individual battery cells, also known as accumulator cells, are connected to one another, i.e. in contact. A combination of a plurality of battery cells is referred to as a battery module. Typically, the battery cells are connected by laser welding. Here, parts of the battery cells, for example conductors, are typically welded to one another in a lap joint, with the weld seams having a so-called "I-seam" geometry, for example. The conductors may be configured as sheets. Materials are usually aluminum, copper, or nickel-plated mild steel (Hilumin®). Typical compounds or material combinations are copper-copper, aluminium-aluminium, copper-aluminium or aluminium-copper, copper-Hilumin® and aluminium-Hilumin®. The copper sheet is often galvanically coated with nickel. Connecting or contacting the battery cells is only successful when there is an electrical connection between the welded parts of the battery cells, for example the conductors, i.e. current can flow between the welded parts via the weld seam.

When welding workpieces using laser welding, in particular in lap joints with I-seams, typical welding defects, so-called defect patterns, may occur. This includes a gap between the welded workpieces. This welding defect may have different effects on the quality of the weld between the workpieces. Even a small gap may reduce the mechanical stability of the weld seam or weld connection. A gap between the welded workpieces may also mean that electrical contact between the welded workpieces is no longer guaranteed and therefore represents a major problem when contacting battery cells.

For some applications, this defect can be tolerated if the gap is small or if the gap is bridged by melted material of the workpieces and there is still an electrical connection and a sufficiently stable mechanical connection. This case is also referred to as "welding with gap bridging" or "gap or weld seam with (electrical) connection".

Another typical defect pattern is referred to as a "false friend". There is a gap between the workpieces, with the gap not being bridged and therefore there being no contact, or at least no electrical contact, between the workpieces to be welded. This is also referred to as "welding without gap bridging" or "gap or weld seam without (electrical) connection".

The detection of welding defects is therefore crucial for the quality of the weld. A weld seam with no welding defects or with a tolerable welding defect may be referred to as a good weld. A weld with an intolerable welding defect, for example the false friend, may be referred to as a bad weld.

SUMMARY OF THE INVENTION

It is an object of the present invention to provide a method and a laser machining system which allow to analyze a weld seam formed between at least two workpieces by a laser welding process quickly, easily, reliably and without contact. A further object of the present invention is to provide a method which allows to determine quickly, easily, reliably and without contact whether a welding defect, in particular a false friend, is present.

In particular, it is an object of the present invention to provide a method and a laser machining system that enable a simple, fast, and reliable classification or differentiation of good welds and bad welds.

These objects are achieved by the subject matter disclosed herein. Advantageous embodiments and developments are also disclosed.

The inventors have recognized that, when a weld is formed for welding workpieces together, the properties of the material of the workpieces forming the weld are modified. For example, the properties may be modified since materials from different workpieces mix when the weld seam is formed and the weld seam therefore consists of a different material than the workpieces, i.e. a mixture of materials from the two workpieces. Additionally or alternatively, the material of the weld seam may have a different microstructure than the material of the workpieces. The material properties of the formed weld differ from the material properties of the (unmachined) workpieces. For example, the temperature conductivity, the thermal conductivity and/or the heat capacity of the weld differ from that of the material of the workpieces. The weld may be a mixture of the materials of the workpieces and the thermal conductivity of the material of the weld formed may be less than that of the unmachined material of at least one of the workpieces. If a welding defect occurs when welding the workpieces, for example a missing bonding or a missing electrical connection, the material of the weld essentially consists of the material of only one of the workpieces.

Accordingly, the thermal conductivity of the material of the weld does not differ, or differs only slightly, from that of the unprocessed material of this workpiece in this case.

The basic idea of the present invention is therefore based on radiating a laser pulse and, after the energy input, measuring the decay behavior of the temperature of the workpiece surface, i.e. the temporal evolution of the surface temperature, for example using photodiodes in order to distinguish weld seams with connection (in particular with electrical contact) and without connection (i.e. without electrical contact). For this purpose, at least one laser pulse is radiated onto the weld seam formed in order to thermally excite the weld seam and to generate a thermal wave in the weld seam. As a result, energy is introduced into the weld and the weld heats up. The thermal excitation of the weld seam thus increases the temperature of the weld seam. After the end of the laser pulse, the thermal excitation decays and the weld seam cools down again. The decay characteristic, also called decay behavior, of the thermal radiation emitted by the weld seam is recorded and evaluated. The decay characteristic of the emitted thermal radiation may include a time profile of an intensity of the emitted thermal radiation after the laser pulse and may be regarded as a measure of the rate at which the thermal excitation in the weld seam decays.

The temperature or thermal conductivity of the material of the weld seam determines the rate at which the weld seam cools after the end of the laser pulse and at which the intensity of the thermal radiation emitted by the weld seam decreases. It is thus possible to draw conclusions about the material or the structure of the weld seam based on the recorded decay characteristics of the emitted thermal radiation. For example, it may be analyzed whether a mixed crystal has formed, e.g. in or on the weld seam. The invention therefore in particular provides a method for characterizing a material state of the weld seam.

For example, the intensity of the thermal radiation emitted may decrease more slowly in the case of a weld seam without a weld defect than in the case of a weld seam with a weld defect. By evaluating the decay characteristic of the thermal radiation, it may thus be determined whether a welding defect is present. Good welds and bad welds can thus be distinguished. Accordingly, a weld seam produced by a laser process may be analyzed and a missing weld connection, in particular a missing electrical contact between welded workpieces, e.g. when connecting battery cells to battery modules, may be detected.

According to a first aspect of the present disclosure, a method for analyzing a weld seam formed by a laser welding process between at least two workpieces is provided, said method comprising: thermally exciting the weld seam by radiating at least one laser pulse onto the weld seam, acquiring a decay characteristic of thermal radiation emitted by the weld seam, and determining whether a welding defect is present based on an evaluation of the acquired decay characteristic.

According to a further aspect of the present disclosure, a laser machining system for analyzing a weld seam formed by a laser welding process is provided, the laser machining system comprising: a laser machining head configured to radiate a laser beam onto at least one workpiece to form the weld seam and to radiate at least one laser pulse onto the weld to thermally excite the weld; a sensor module for detecting thermal radiation emitted by the weld seam; and a control device configured to determine whether a weld defect is present based on a decay characteristic of the thermal radiation emitted from the weld. In particular, the laser machining system may include a control unit configured to carry out the method according to embodiments of the present invention.

Aspects of the present disclosure may include one or more of the following optional features.

The decay characteristic of the thermal radiation emitted by the weld seam may represent a time profile of the surface temperature of the weld seam after thermal excitation. The detected temperature radiation may always come from the same region of the workpiece surface, preferably from a region of the weld seam surface, particularly preferably from a region of the weld seam into which the laser pulse was radiated.

The method may comprise a laser welding process for forming the weld and thereby welding the workpieces together. The method or the laser welding process may comprise radiating a laser beam, also referred to below as a machining laser beam or machining beam for short, onto one or more of the workpieces in order to form the weld seam. In particular, the weld seam may be formed for welding a first workpiece to at least one second workpiece. When the machining laser beam is radiated to form the weld seam, the at least two workpieces may be arranged in a lap joint or in a parallel joint. The seam geometry of the weld seam may be an I-seam or a lap seam, for example.

The steps of the method for analyzing the weld seam, i.e., thermally exciting the weld seam, measuring or acquiring the decay characteristic and determining whether there is a welding defect, may be carried out during the laser welding process. For example, the laser welding process may be performed to form regions of the weld seam and the steps of analyzing the weld may be performed on an already formed region of the weld seam for which it is to be determined whether the weld defect is present. Accordingly, the method may be referred to as an "inline post-process" method. Alternatively or additionally, the steps for analyzing the weld seam may be carried out after the end of the laser welding process, in particular after the weld seam has been completely formed. In this case, the method may be referred to as a "post-process" method.

The weld defect may comprise a missing weld connection between the welded workpieces. The welded connection can be an electrical and/or mechanical connection between the workpieces. For example, a weld defect may indicate that there is no mechanical and/or electrical connection between the welded workpieces. An electrical connection means that an electric current can flow between the workpieces via the weld seam. The weld seam must therefore be electrically conductive. A mechanical connection means that the workpieces are substance-to-substance bonded by means of the weld seam. On the other hand, the method may be used to determine whether there is a mechanical and/or electrical connection between the welded workpieces.

The welding defect may also include a gap between the workpieces, in particular a gap without a connection between the workpieces. The latter describes the case in which there is a gap between the welded workpieces, but it is not bridged by the material of the weld seam. This welding defect may be called a false friend.

Based on the determination of whether a weld defect is present, the welded workpieces or weld may be classified or marked as "good" or good weld (i.e. suitable for further processing or sale) or as "bad" or bad weld (i.e., scrap). When it is determined that there is no welding defect, the welded workpieces or the weld may be marked as a good weld, and when it is determined that there is a welding defect, the welded workpieces may be marked as a bad weld.

In particular in the case of a good weld, there may be an electrical connection between the connected workpieces. A good weld may include the case where there is no gap between the welded workpieces (so-called "zero gap") and may include the case where there is a gap but it is bridged (gap with connection or gap bridging).

Based on the result of the analysis, in particular the determination of whether there is a welding defect, the on-going laser welding process (in the case of an inline post-process method) or subsequent laser welding processes may be controlled. For example, machining parameters such as supplied laser power, distance of a laser machining head from the workpieces, a focus position and/or focus location of the machining beam used for laser welding may be adapted for a laser welding process of a further weld seam. The method may further comprise outputting an error and/or a warning when it is determined that a welding error is present.

The thermal excitation of the weld seam by radiating the laser pulse may be a pulsed excitation, in particular a temporally and/or spatially pulsed excitation. The weld seam may be thermally excited in a region close to the surface. The thermal excitation may also be referred to as a heat pulse. The thermal excitation may form or generate a thermal wave, also known as a temperature wave or heat wave, in the weld seam.

The thermal radiation emitted by the weld seam, in particular by a surface of the weld seam, may also be referred to as thermal emission. The thermal radiation may include infrared radiation or IR radiation. The acquisition of the decay characteristic of the emitted thermal radiation may comprise measuring an intensity of the thermal radiation emitted by the weld seam surface at least at a specified time, in particular at a specified time after the radiation of a laser pulse. The acquisition of the decay characteristic of the emitted thermal radiation may comprise measuring an intensity of the thermal radiation emitted by the weld seam surface and/or acquiring a time profile of the measured intensity. A time profile of the measured intensity of the thermal radiation emitted by the weld seam surface may be acquired discretely or continuously. By acquiring the decay characteristic of the emitted thermal radiation, a time profile of the temperature of the weld seam or weld seam surface may be determined.

The decay characteristic of the emitted temperature radiation may be acquired by means of a photodiode. In particular, the intensity of the temperature radiation may be measured by the photodiode. The photodiode may be particularly sensitive in the infrared wavelength range. Based thereon, a measurement signal may be generated and output by the photodiode. The measurement signal may be variable over time. The measurement signal may be an analog/digital measurement signal, in particular an analog/digital voltage signal.

The method may comprise preprocessing the measurement signal. For example, the analog measurement signal may be converted into a digital measurement signal that includes measurement values associated with times. Furthermore, the method may comprise smoothing and/or filtering. Furthermore, the method may comprise fitting the measurement signal to an analytical equation or curve, for example to a one-dimensional diffusion equation or curve.

Determining whether a weld defect is present may comprise comparing the acquired decay characteristic to a predetermined reference decay characteristic. The reference decay characteristic may correspond to a decay characteristic of a good weld, i.e. a weld free of defects, or a decay characteristic of the unmachined workpiece or a decay characteristic for unmachined workpiece material. It may be determined that there is a welding defect when the decay characteristic deviates from the specified reference decay characteristic for a good weld by more than a specified value or is outside a specified tolerance range, e.g. when a value of the decay characteristic is less than a value of the predetermined reference decay characteristic for a good weld by more than a specified value. The value of the decay characteristic may be associated a predetermined time after the end of the laser pulse. When the value of the decay characteristic is less than the corresponding value of the specified reference decay characteristic for a good weld, this corresponds to the case that the weld cools faster than for a good weld, i.e. that the thermal conductivity of the weld differs significantly from the thermal conductivity of a good weld. Therefore, it can be determined that there is a welding defect. When the reference decay characteristic corresponds to a decay characteristic for unmachined workpiece material, it can be determined that there is a welding defect when the decay characteristic corresponds, within a predetermined tolerance range, to the reference decay characteristic for unmachined workpiece material. In this case, the thermal conductivity of the material of the weld seam does not differ significantly from the thermal conductivity of the material of an unmachined workpiece, in particular of an unmachined material of a workpiece arranged at the top in the direction of laser radiation, so that a missing weld connection or a welding defect can be inferred. For example, pure copper (Cu) cools faster and a mixed compound of copper and aluminum (Cu—Al) cools more slowly.

The evaluation of the decay characteristic of the thermal radiation may further comprise determining a first time derivative of the decay characteristic. Furthermore, the first time derivative may be compared with a reference curve or reference value for the derivative in the case of a good weld. It may be determined that a welding defect is present when a value of the derivative is less than a predetermined reference value for the derivative or when a magnitude of said value is greater than a magnitude of the predetermined reference value for the derivative. This corresponds to the case where the weld cools relatively quickly. Further, it may be determined that there is no welding defect when the value of the derivative is equal to or larger than the predetermined reference value for the derivative or when a magnitude of said value is equal to or less than a magnitude of the predetermined reference value for the derivative. The value of the derivation and the predetermined reference value for the derivation may be associated with a predetermined time after the end of the laser pulse.

The reference decay characteristic and the reference value for the derivative may be predetermined based on or dependent on the material, thickness and/or shape of at least one of the workpieces. Determining the reference decay characteristic and the reference value for the derivative may comprise radiating the laser pulse and acquiring the decay characteristic at or from a region outside the weld seam, for example a region of an unmachined workpiece surface. The decay characteristic acquired in this way may serve as a reference decay characteristic.

The steps of the method for analyzing the weld seam, i.e. thermally exciting the weld seam, acquiring the decay characteristic and determining whether there is a welding defect, may be carried out for a plurality of regions of the weld seam for which it is to be respectively determined whether a welding defect is present. As a result, regions along the weld in which there is a welding defect may be distinguished from regions along the weld in which there is no welding defect. Accordingly, it can be determined whether, at least in a region along the weld seam between the workpieces, there is no welding defect. When it has been determined that there is no welding defect at least in a region along the weld seam between the workpieces, the entire weld seam may be defined as having no welding defect. For example, it may be determined that there is electrical contact between the workpieces even though there are regions of the weld where there is no electrical contact between the workpieces. Accordingly, a heterogeneous weld seam, in which there are regions with welding defects, in particular without electrical contact, and regions without welding defects, may be analyzed. Furthermore, welding defects along the weld seam may be localized in this way. Physical parameters such as the strength or the absolute electrical conductivity of the weld connection may be estimated by evaluating the portions with welding defects and without a connection.

Radiating the laser pulse may comprise radiating a single laser pulse or radiating a plurality of laser pulses. A plurality of laser pulses may also be referred to as a laser pulse sequence, or pulse sequence for short. Radiating a plurality of laser pulses may comprise radiating a periodically modulated laser beam and/or radiating a sinusoidally modulated laser beam.

While a plurality of laser pulses are radiated, an intensity profile of the thermal radiation emitted may be acquired. A phase response and an amplitude response may be calculated from the intensity profile by means of Fourier transformation. The phase and amplitude responses may be evaluated, for example, using lock-in thermography methods and/or pulse-phase methods in order to detect defects such as pores or interfaces in the weld seam.

The duration of the at least one laser pulse may be between 20 ms and 40 ms, preferably 30 ms. The laser power of the at least one laser pulse may be between 1 W and 1 kW, or between 5 W and 300 W. For example, the laser power may be about 300 W.

When a single laser pulse is radiated, the laser power and/or duration of the laser pulse is preferably selected in such a way that the penetration depth of a thermal excitation caused by the laser pulse in the weld seam is relatively small. For example, the penetration depth may be smaller than the thickness of a workpiece, for example the workpiece on which the weld seam is formed or which is at the top in the direction of laser radiation. The penetration depth of the heat wave into the weld seam may be between 0.3 mm and 0.5 mm, for example.

If a pulse sequence is radiated, the laser power and/or duration of the laser pulses and/or a duration of the pulse sequence is preferably selected such that a penetration depth of a thermal excitation caused by the pulse sequence in the weld seam is relatively large. For example, the penetration depth may be greater than the thickness of a workpiece, for example the workpiece on which the weld seam is formed or which is at the top in the direction of laser radiation. The penetration depth may roughly correspond to the sum of the thicknesses of the workpieces to be welded together.

The energy input by means of the laser pulse or the pulse sequence may be set such that it is below a threshold value at which the material of the weld seam and/or one of the workpieces is modified and/or melts. The laser pulse is only used for analysis and should not modify the weld seam.

The decay characteristic of the thermal radiation emitted by the weld seam may be acquired immediately after the end of the laser pulse or immediately after the end of the pulse sequence. The end of the pulse sequence may correspond to the end of the last laser pulse of the pulse sequence.

The end of the laser pulse refers an end time of the laser beam. The end time of the laser pulse may be determined based on a measurement of an intensity of laser light reflected back from the weld seam. The intensity of the laser light reflected back may be measured at a wavelength of the radiated laser pulse. The measurement may take place, for example, with a photodiode sensitive at this wavelength and/or a bandpass filter. Based on the measurement of the intensity of the laser light reflected back, a time profile of the intensity of the laser light reflected back may be acquired.

The end time of the laser pulse may be determined as a time from which the intensity of the reflected laser light falls below a predetermined threshold value. At this time, the acquisition if the decay characteristic of the temperature radiation may begin. Alternatively, the measurement of the emitted thermal radiation may already be started during the laser pulse or the pulse sequence.

The workpieces may be formed of metal or may include metal. One or more of the workpieces may include aluminum, steel, copper, copper coated with nickel, preferably copper galvanically coated with nickel, Hilumin® (mild steel with a nickel layer) and/or nickel or may consist of these materials.

The workpieces that are welded together or are to be welded together may preferably include different metals or consist of different metals. The heat conductivity and/or thermal conductivity of at least one of the workpieces may be different from the heat conductivity and/or thermal conductivity of the mixture of the different materials produced when a weld seam with an electrical connection is formed. For example, the weld seam with electrical connection may have a lower thermal conductivity than at least one of the metals. For example, one of the workpieces may include or consist of copper or nickel-plated copper and another of the workpieces may include or consist of aluminum. The weld seam with electrical connection (good weld) may include or consist of a copper-aluminum mixed crystal. The weld seam with electrical connection may also have intermetallic Cu—Al phases. For example, the thermal conductivity of the aluminum mixed crystal or the intermetallic phases may be lower than the thermal conductivity of copper and/or aluminum.

At least one of the workpieces can have a thickness between 0.05 mm and 5 mm, a thickness between 1 mm and 5 mm, a thickness between 0.1 mm and 1 mm, a thickness between 0.05 mm and 1 mm, a thickness between 0.2 mm and 0.4 mm, a thickness between 0.4 mm and 0.5 mm, or a thickness of 0.3 mm or a thickness of 0.07 mm. For example, two workpieces each have a thickness of 0.3 mm. At least one of the workpieces may be formed as a sheet or may comprise a sheet. For example, two workpieces to be welded are formed as a sheet.

Preferably, the method for analyzing the weld seam is used in battery contacting to determine whether there is electrical contact between the welded workpieces. The workpieces may include a part, in particular a conductor or terminal, of a first battery cell (or battery or battery pack) and a part, in particular a conductor or terminal, of a second battery cell (or battery or battery pack). A missing electrical contact between the conductors of the battery cells may be determined or detected as a welding defect. The workpieces may also be or comprise cell connectors or bus bars.

The first battery cell and/or the second battery cell may be configured as a pouch battery cell, a prismatic battery cell or a cylindrical battery cell or may comprise at least one of these battery cells.

In particular, the battery cells may be configured as pouch battery cells. In this case, the part of the first battery cell may include aluminum and the part of the second battery cell may include copper, the latter optionally being coated with nickel (layer thickness e.g. 8 µm). Alternatively, the part of the first battery cell and the part of the second battery cell may both include the same material, e.g. copper or aluminum. The nickel coating may be applied galvanically. A thickness of the parts of the battery cells may be between 0.2 mm and 0.4 mm.

Furthermore, the battery cells may be configured as prismatic battery cells. In this case, the part of the first battery cell and the part of the second battery cell may both be made of the same material, for example aluminum. A thickness of the parts of the two battery cells may be between 0.5 mm and 5 mm.

In addition, the battery cells may be configured as cylindrical battery cells. In this case, the part of the first battery cell may include copper or aluminum and the part of the second battery cell may include Hilumin® (nickel-coated mild steel), aluminum or copper. The copper may optionally be coated with nickel (layer thickness e.g. 8 µm). The nickel coating may be applied galvanically. A thickness of the parts of the two battery cells may be between 0.4 mm and 0.5 mm.

In the aforementioned cases, the part of the first battery cell may be the one onto which the machining beam for forming the weld seam is radiated. Accordingly, the weld seam may be formed at least on or at the part of the first battery cell. The parts of the battery cells may be conductors or include conductors.

A laser beam for generating the at least one laser pulse may be referred to as an excitation beam. The excitation beam may be generated and radiated onto the weld seam in a pulsed manner in order to generate the at least one laser pulse. The excitation beam may therefore be a pulsed laser beam. The machining beam may be a continuous laser beam. The machining beam is preferably radiated in a continuous-wave operating mode (CW mode) of the laser source. The power of the excitation laser beam may be less than a power of the machining laser beam. The power may indicate a time-averaged power.

The laser machining head may include at least one laser source for generating a laser beam. For example, the laser machining head may include a laser source configured to generate both the machining beam and the excitation beam. Accordingly, the laser source may be configured to generate a continuous machining beam and a pulsed excitation beam. For generating the pulsed excitation beam, the laser source may be operated in a pulsed mode. Alternatively, the laser machining head may comprise a first laser source for generating the machining laser beam and a second laser source for generating the excitation beam.

The machining beam and/or the excitation beam may have a wavelength in the infrared spectral range, in particular in a range between 1030 nm and 1070 nm, or in the visible green spectral range, in particular in a range between 500 and 570 nm, preferably at 515 nm, or in the visible blue spectral range, in particular in a range from 400 nm to 500 nm or in a range between 440 and 460 nm, preferably at 450 nm. The machining laser beam and the excitation laser beam may have the same or a different wavelength.

The laser machining head may be configured as a so-called fixed optics laser machining head or as a so-called scanner laser machining head. The scanner laser machining head may include a deflection unit for deflecting the machining beam and the excitation beam on a workpiece. The deflection unit may include a scanner optics, scanner system, scanner mirror and/or a galvanic scanner. In the fixed optics laser machining head, the laser beam may be moved relative to a workpiece by moving the laser machining head itself or the workpiece is moved relative to the laser machining head.

The sensor module comprises at least one detector for detecting the thermal radiation emitted by the weld seam. In addition, the sensor module may include at least one detector for detecting reflected laser light. The detector may be configured to detect an intensity in a specific wavelength range.

The detector may be further configured to output a measurement signal based on the detection. The detector may be configured as a photodiode and/or a photodiode array or a camera, for example a CMOS or CCD-based camera, or may comprise one of these. The detector may only be sensitive to a certain wavelength or in a certain wavelength range. For example, a first detector may be sensitive to a thermal radiation wavelength range (e.g. in the IR range) in order to detect the thermal radiation emitted by the weld seam. A second detector may be sensitive in a laser emission wavelength range of the at least one laser source in order to detect the laser light reflected back. Accordingly, the method according to the invention may be carried out with the laser machining system. In particular, the thermal radiation emitted by the weld seam may be detected by the sensor module described.

According to embodiments, the sensor module or the detector may be coupled to the laser machining head. The laser machining head may include a beam splitter for decoupling radiation reflected or emitted by the surface of the workpiece or the weld seam. Alternatively, the beam path of the laser beam may be angled and the beam path for the emitted thermal radiation may be straight. This radiation may include the reflected laser light and/or the thermal radiation emitted by the weld seam. The laser machining head may include an optical output for coupling out the radiation and the sensor module may include an optical input for coupling in the radiation coupled out of the laser machining head. The sensor module or the detector or the photodiode may be arranged along or coaxially to the optical axis of the laser machining head or beam propagation direction of the laser beam. In other words, a beam path of the reflected laser light and/or the thermal radiation emitted by the weld seam between the workpiece or the weld seam and the detector may extend at least partially within the laser machining head and/or at least partially coaxially with the beam path of the laser beam. Alternatively, the sensor module or the detector may be arranged such that a beam path of the thermal radiation emitted by the weld seam extends completely outside the laser machining head between the weld seam and the detector.

Alternatively or additionally, the sensor module may include at least one detector in the laser source. In other words, the sensor module may include an in-laser detector. In this case, the thermal radiation emitted may be coupled into an optical fiber for guiding the laser beam generated by the laser source via optical elements of the laser machining head and hit the detector in the laser source.

The laser machining system may perform the laser welding process by radiating the machining laser beam onto at least one of workpieces to be welded in order to weld the workpieces to each other. The control device may be configured to control the laser source and/or the laser machining head in order to carry out the laser welding process.

According to embodiments, the laser machining system may be configured to carry out the method for analyzing the weld seam according to embodiments. In particular, the control device of the laser machining system may be configured to control the laser machining system, in particular the laser source, the laser machining head and/or the sensor module, in order to carry out the method for analyzing the weld seam according to embodiments of the present disclosure. The control unit may be configured to control the laser machining system, in particular the laser machining head, based on the result of the analysis of the weld seam, in particular whether there is a welding defect.

BRIEF DESCRIPTION OF THE DRAWINGS

The invention is described in detail below with reference to figures. In the figures:

FIGS. 7A-7D show graphs with intensity curves of a thermal radiation emitted from the weld seams shown in FIGS. 5A-5D for methods according to embodiments.

DETAILED DESCRIPTION OF THE INVENTION

Figure 1A:
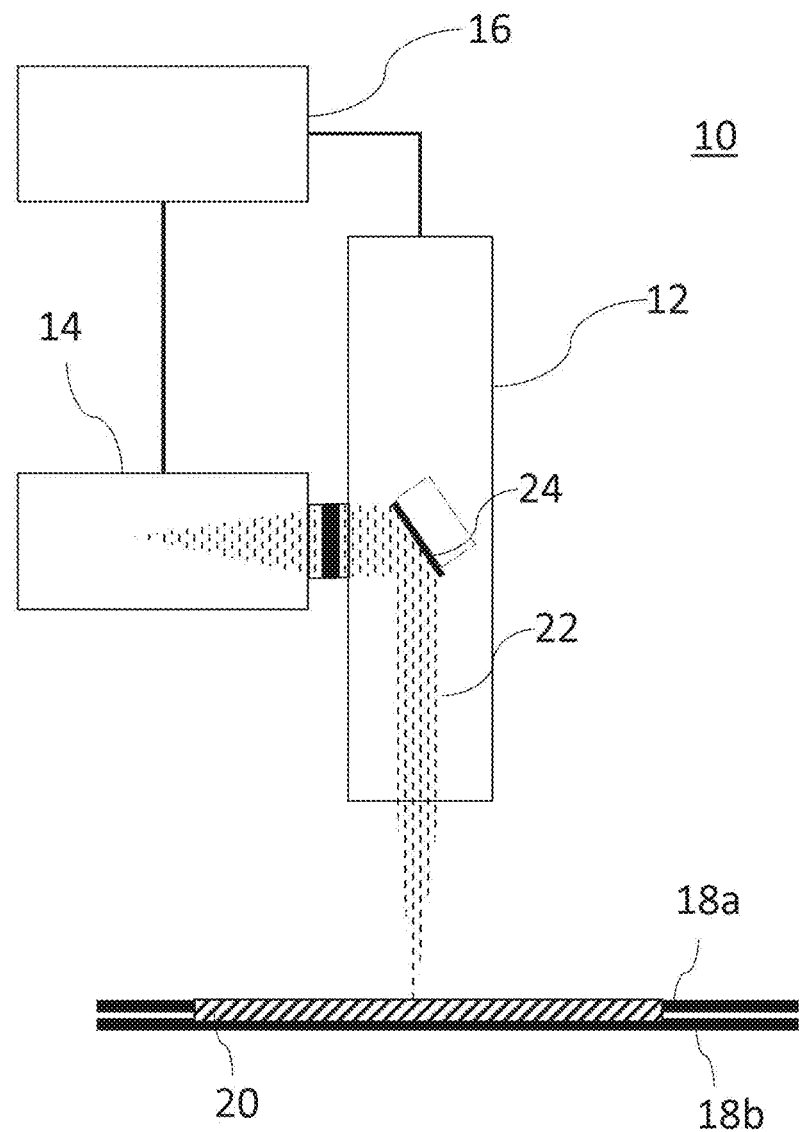
FIG. 1A shows a schematic diagram of a laser machining system for machining a workpiece by means of a laser beam and for analyzing a weld seam formed by a laser welding process according to embodiments.

Unless otherwise noted, the same reference symbols are used for identical and equivalent elements below.

FIG. 1 shows a schematic diagram of a laser machining system for machining a workpiece by means of a laser beam and for analyzing a weld seam formed by a laser welding process according to embodiments.

The laser machining system 10 includes a laser machining head 12, a sensor module 14 and a control unit 16.

The laser machining head 12, in particular a laser welding head, is configured to focus a machining beam (not shown) emerging from a laser source or an end of a laser optical fiber with the aid of a beam guiding and focusing optics (not shown) and radiate it onto at least one workpiece 18a, 18b, thereby performing a laser welding process. A weld seam 20 is formed by radiating the machining laser beam onto at least one of the workpieces 18a, 18b in order to weld the two workpieces 18a, 18b together. Furthermore, the laser machining head 12 is configured to radiate an excitation laser beam onto the weld seam 20. According to embodiments, the excitation laser beam and the machining laser beam may be generated by the same laser source and/or may extend coaxially at least in sections. The excitation laser beam is radiated onto the weld seam 20 by a single laser pulse or a plurality of laser pulses.

When the excitation laser beam is radiated onto the weld seam 20, part of it is reflected by the weld seam 20. This reflected laser light of the excitation laser beam and the thermal radiation 22 emitted by the weld seam 20 itself enter the laser machining head 12 and are coupled out of the beam path of the machining laser beam by a beam splitter 24 there. The reflected laser light of the excitation laser beam and the thermal radiation 22 emitted by the weld seam 20 are directed into the sensor module 14 and hit at least one detector (not shown) there. The at least one detector is configured to measure an intensity of the thermal radiation emitted by the weld seam 20 (and optionally an intensity of the reflected laser light) and to generate and output a measurement signal based thereon. The at least one detector may comprise a photodiode or a photodiode or pixel array. According to embodiments, the sensor module 14 includes a first detector for measuring an intensity of the reflected laser light and a second detector for measuring an intensity of the thermal radiation emitted by the weld seam 20, with both detectors configured as photodiodes.

The control unit 16 is connected to the sensor module 14 and receives the measurement signal from the at least one detector. The control unit 16 may be configured to record the measurement signal. As a result, a profile of the intensity of the emitted thermal radiation (and optionally a profile of the intensity of the laser light of the excitation laser beam reflected back) may be obtained. The control unit 16 is configured to analyze the weld seam 20 based on the recorded intensity profile of the thermal radiation and in particular to determine whether a welding defect has occurred when forming the weld seam 20.

The laser machining system 10 is configured to carry out a method for analyzing a weld seam produced by the laser welding process according to embodiments.

In the embodiment of the laser machining system 10 shown in FIG. 1A, a beam path of the emitted thermal radiation 22 between the weld seam 20 and the detector is at least in sections within the laser machining head 12 and/or coaxially with the beam path of the machining laser beam. In FIG. 1A, the thermal radiation 22 that has been emitted and entered the laser machining head 12 is deflected at a beam splitter 24 to the detector or sensor module 14. Alternatively, of course, the laser beam may be deflected at the beam splitter 24 and the path of the emitted thermal radiation 22 between the weld seam 20 and the detector may be linear.

Figure 1B:
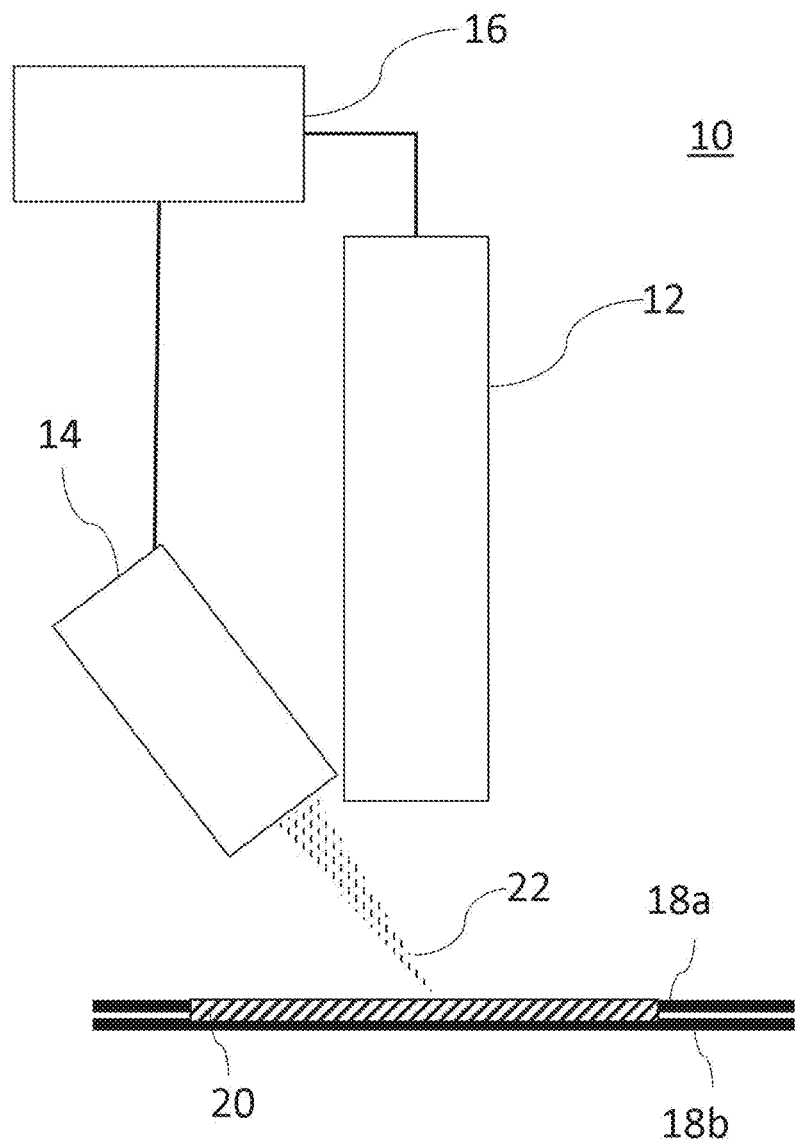
FIG. 1B shows a schematic diagram of a laser machining system for machining a workpiece by means of a laser beam and for analyzing a weld seam formed by a laser welding process according to further embodiments.

FIG. 1B shows a schematic diagram of a laser machining system 10 according to further embodiments. The laser machining system 10 shown in FIG. 1B is similar to the laser machining system 10 shown in FIG. 1A, which is why only the differences are described below.

As shown in FIG. 1B, the sensor module 14 or the detector is arranged such that a beam path of the emitted thermal radiation 22 is completely outside of the laser machining head 12 between the weld seam 20 and the detector. In this case, the beam splitter 24 shown in FIG. 1A and the interface between the sensor module 14 and the laser machining head 12 are not required.

According to the embodiment shown in FIG. 1A, the sensor module 14 is thus arranged on the laser machining head 12, with a beam path of the emitted thermal radiation 22 between the weld seam 20 and the detector extending at least in sections within the laser machining head 12 and/or coaxially with the beam path of the machining laser beam. This may also be referred to as an axial arrangement of the sensor module 14 or the detector. According to the embodiment shown in FIG. 1B, the sensor module 14 is also arranged on the laser machining head 12, wherein a beam path of the emitted thermal radiation 22 between the weld seam 20 and the detector extends completely outside of the laser machining head 12. This may also be referred to as off-axis arrangement of the sensor module 14 or of the detector. In this case, the sensor module 14 may also be provided as a separate component and/or detached from the laser machining head 12. According to further specific embodiments that are not shown, the sensor module 14 may include a detector arranged in the laser source. In other words, the sensor module 14 may include an in-laser detector. In this case, the thermal radiation emitted may be coupled into an optical fiber for guiding the laser beam generated by the laser source via optical elements of the laser machining head 12 and hit the detector in the laser source.

According to embodiments, the laser machining head 12 may be configured as a so-called fixed optics laser machining head or as a so-called scanner optics laser machining head.

Figure 2:
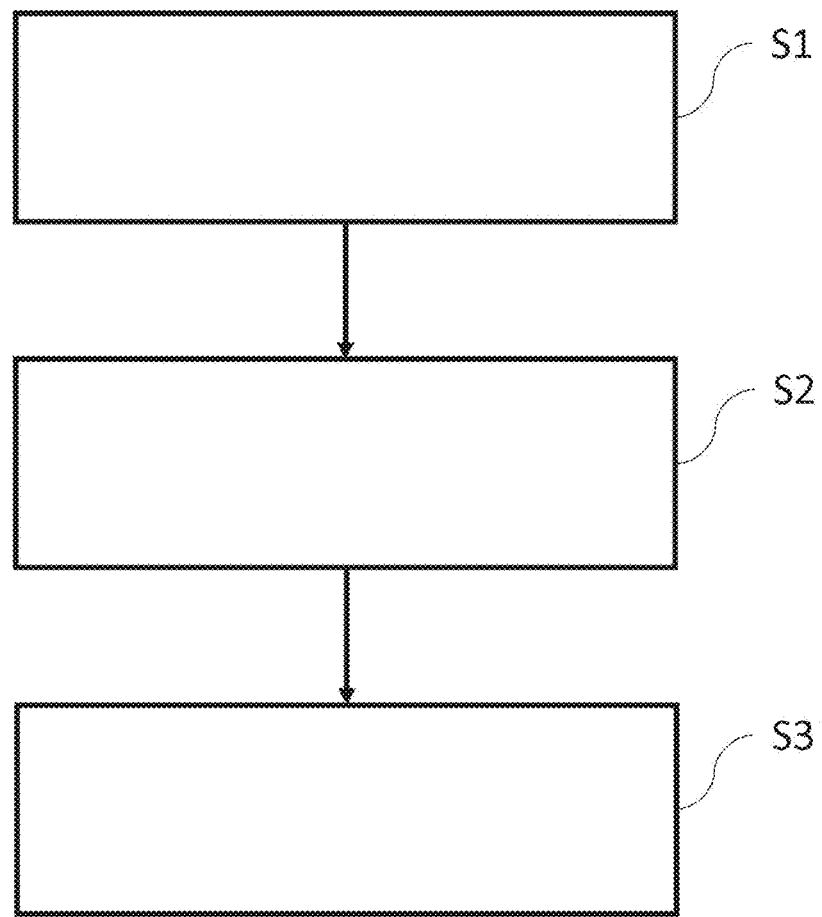
FIG. 2 shows a flow chart of a method for analyzing a weld seam according to embodiments.

FIG. 2 shows a flow chart of a method for analyzing a weld seam formed between at least two workpieces by a laser welding process according to embodiments.

The method starts radiating (S1) at least one laser pulse onto the weld seam to thermally excite the weld seam. The laser pulse may also be referred to as a laser flash. The decay characteristic of a thermal radiation emitted by the weld seam is then acquired (S2). As a last step, it is determined whether there is a welding defect based on an evaluation of the acquired decay characteristic (S3).

Before step S1 of thermally exciting the weld seam by radiating at least one laser pulse onto the weld seam, the method according to embodiments may include a step of forming a weld seam by radiating a machining beam onto at least one of two or more workpieces to be welded. According to embodiments, steps S1-S3 of analyzing the weld seam occur after the step of forming the weld seam, at least at the point to be analyzed, for example after the weld seam (at least at the point to be analyzed) has cooled to ambient temperature and/or after the material of the weld seam (at least at the point to be analyzed) has solidified. For example, two sheets may be welded together in a lap or parallel joint. The workpiece onto which the laser beam is radiated may be referred to as the top sheet.

The machining laser beam is radiated onto the points at which a welding connection, in particular a mechanical and/or electrical connection, is to be produced between the workpieces by means of the weld seam formed as a result. Such a weld seam is called a contact weld seam.

When the machining laser beam is radiated onto at least one of the workpieces, the materials of the workpieces are melted locally, flow together and mix and thus form the material for the weld seam. A mixed crystal or an intermetallic phase is formed. Both have poorer heat and thermal conductivity than the pure base material. It may happen that there is a gap between the workpieces when the machining beam is radiated in. The melted material of the workpieces may not be sufficient to bridge the gap and/or the melted materials of the respective workpieces do not mix. After the end of the laser welding process, a gap that is not bridged remains between the workpieces at the points where the welding connection of the workpieces was intended. This is also referred to as a gap without connection.

It may also happen that the welding depth in one of the workpieces, for example the top sheet, was not large enough. The welding depth describes a depth in the workpiece up to which the material of the workpiece is melted by the laser beam. In this case, it may also happen that insufficient material of the workpieces is melted and/or that the melted materials of the respective workpieces do not mix.

In both cases, the weld seam does not form a mechanical and/or electrical connection. This is considered a welding defect. If there is a welding defect, the welded workpieces may be marked as bad weld and sorted out as scrap. When there is no welding defect, the welded workpieces may be marked as a good weld. The method according to embodiments allows for quick, easy, reliable, and non-contact analysis of a weld seam and makes a determination of whether a weld defect has occurred possible.

The method is based on the finding that, when a proper weld seam is formed, i.e. a weld seam without welding defects, the material and/or the structure of the weld seam differs from that of the unmachined materials of the workpieces. For example, of the sheets to be welded in the lap joint described above, one sheet, preferably the top sheet, is made of copper and the other sheet is made of aluminum. In this case, when the melted materials are mixed, a copper-aluminum mixed crystal and/or intermetallic copper-aluminum phases are formed in the weld seam. On the other hand, when one of the welding defects described above occurs, the material of the weld consists substantially of the material of the workpiece onto which the machining laser beam was radiated, i.e. the top sheet. For example, when a welding defect occurs, the materials do not mix. For example, when the machining laser beam was radiated onto the top sheet made of copper, the material of the weld seam may essentially consist of copper when the welding defect is present.

According to embodiments, in step S1, at least one laser pulse of the excitation laser beam is radiated onto a region of the formed weld seam for which it is to be determined whether a welding defect is present. The energy input from the laser pulse increases the temperature of the material of the weld seam at this point or region. The weld seam is thermally excited.

In step S2, a decay characteristic of the thermal radiation emitted by this region of the weld seam is then acquired. The decay characteristic of the emitted thermal radiation may correspond to an intensity of the thermal radiation at a specific time after the end of the laser pulse or to a time-dependent intensity curve of the thermal radiation after the end of the laser pulse. The intensity may have the unit $W/m^2$. The intensity of the thermal radiation may be measured without contact, for example using the sensor unit described with reference to FIGS. 1A and 1B. The thermal conductivity of the weld seam material determines the rate at which the weld seam cools after the end of the laser pulse and at which the intensity of the thermal radiation emitted by the weld seam decreases.

Based on the evaluation of the intensity or the intensity curve of the emitted thermal radiation in step S3 and thus the decay characteristics of the thermal radiation, conclusions can be drawn about the material or material properties of the weld seam. Based thereon, it can be determined whether a welding defect has occurred in the observed region of the weld.

The method described may be repeated for one or more regions of the weld. A heterogeneous weld seam may thus be analyzed in which there are regions with welding defects, in particular without electrical contact, and regions without welding defects. Embodiments of the method are described in detail below.

Figure 3C:
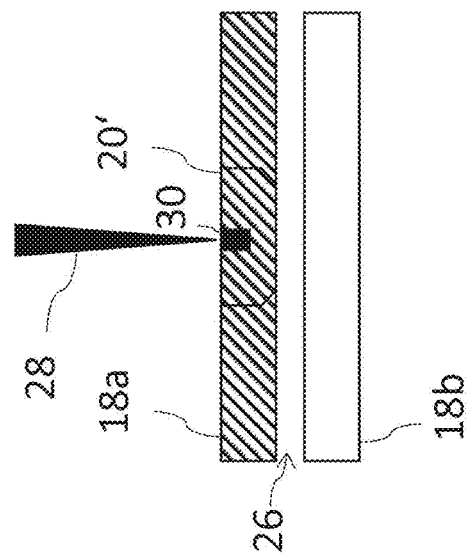
FIGS. 3B and 3C show schematic cross sections of workpieces and weld seams for illustrating a method for analyzing a weld seam according to a first embodiment of the invention.
Figure 3B:
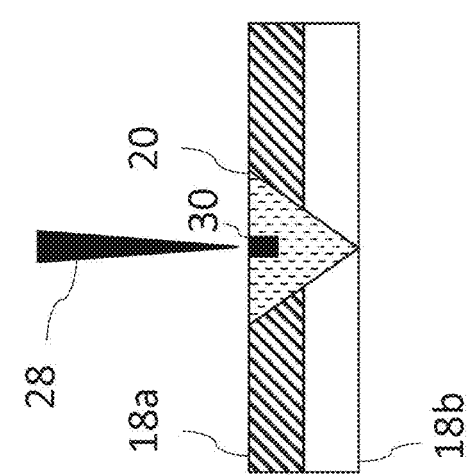
Figure 3A:
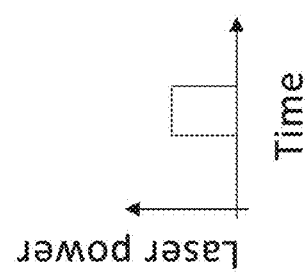
FIG. 3A schematically shows a laser pulse of an excitation beam.

FIGS. 3A to 3C schematically show a laser pulse of an excitation beam and schematic cross sections of welded workpieces for illustrating a method of analyzing a weld according to a first embodiment of the invention.

The method is carried out as an inline post-process method immediately after the laser welding or formation of the weld seam or as a post-process method during the laser welding and after formation of a region of the weld seam. A laser pulse is radiated into a finished and cooled region of the weld seam. The energy input increases the temperature at this point. When the laser pulse has ended, i.e. when the laser is off, the surface of the weld seam cools down again. The time profile of the surface temperature is recorded by a photodiode and evaluated, for example. The assumption here is that the penetration depth of a temperature wave generated as a result is small. Such a transient wave does not interact with defects in the weld. There is no interference at interfaces or pores. In this case, the method may be used to evaluate how well the heated material conducts heat. The classification into good weld, i.e. weld seam with electrical contact, and bad weld, i.e. weld seam without electrical contact, is carried out by recording and evaluating the thermal radiation or the photodiode signals after a laser pulse. Thus, the decay behavior of the surface emissions, i.e. the surface temperature, is recorded and evaluated.

The method according to the first embodiment is described in detail below using the example of battery module production.

The two workpieces 18a, 18b shown in cross section in FIGS. 3B and 3C represent conductors of two pouch battery cells which are to be welded to one another in order to connect the pouch battery cells to one another. For this, it is required that an electric current can flow between the workpieces 18a, 18b via the weld seam formed in the process. The weld seam is therefore to create an electrical connection between the workpieces 18a, 18b. The lack of electrical connection is considered a welding defect. The two workpieces or conductors 18a, 18b are welded to one another in lap joint via a weld seam with an I-seam geometry. The two workpieces 18a, 18b are each configured as a sheet. The first workpiece 18a is formed of nickel-plated copper and the second workpiece 18b is formed of aluminum. Thus, Cu (coated with Ni) and Al are welded. Both sheets have a thickness of approx. 0.3 mm.

When the weld seam forms a connection, a Cu—Al mixed crystal including intermetallic phases is present. This microstructure is a poor conductor of heat. The surface temperature takes a long time to decay. In the case of a false friend, the heated material, i.e. a point on the weld, consists entirely of copper. Copper is a very good heat conductor and accordingly the cooling of the surface temperature after the laser pulse is fast. Based on the intensity of the thermal radiation emitted at a specific time or based on the intensity curve of the thermal radiation emitted after the end of the laser pulse or thermal excitation, it can be determined whether there is a welding defect, i.e. a bad weld.

FIG. 3B shows the case of a weld seam 20 properly formed by the laser welding process, i.e. a weld seam without welding defects. The weld seam 20 creates a mechanical and electrical connection between the workpieces 18a, 18b. The weld seam 20 consists of a mixture of the materials of the workpieces 18a, 18b, in particular a (solid) copper-aluminum mixture or a copper-aluminum (Cu—Al) mixed crystal, and/or intermetallic phases. Such microstructures are a poorer conductor of heat than copper or aluminum.

FIG. 3C shows the case of a weld seam 20' with a welding defect. The weld seam 20' does not create any mechanical or electrical connection between the workpieces 18a, 18b. There is a gap between the workpieces 18a, 18b which is not bridged by the material of the weld seam 20'. The workpieces 18a, 18b have no connection. The material of the weld seam 20' essentially consists of the material of the top plate 18a, namely copper. Oxidation effects can be neglected here. Copper has a relatively good thermal conductivity. Thus, the material of the weld seam 20' is a relatively good heat conductor and has better thermal conductivity than the material of the weld seam 20 of FIG. 3B.

In step S1, a single laser pulse of an excitation laser beam 28 is radiated onto the weld seam 20 or 20'. FIG. 3A schematically shows the time profile of a laser power of the laser pulse or of the excitation laser beam 28. As shown, the laser pulse is substantially rectangular. The power and/or duration of the laser pulse is selected such that the laser pulse couples into the weld seam 20, 20', but the material of the weld seam 20, 20' is not melted again. For example, the laser pulse has a duration of 30 ms and a power of 300 W.

Coupling the laser pulse into the weld seam 20, 20' results in energy being introduced into the weld seam 20, 20' due to the excitation laser beam 28 being radiated onto the weld seam 20, 20', and the temperature of the weld seam 20, 20' increases as a result. The weld seam 20, 20' heats up, i.e. is thermally excited. The thermal excitation takes place in a region 30 near the surface of the weld seam 20, 20' around the point of incidence of the excitation laser beam 28 on the weld seam surface.

The thermal excitation of the weld seam 20, 20' generates a thermal wave in the weld seam 20, 20'. The power and/or duration of the laser pulse may be selected such that the penetration depth of the thermal wave into the weld seam 20, 20' is relatively small. The penetration depth of the thermal wave is illustrated by region 30 in FIGS. 3A and 3B. For example, according to the first embodiment, the penetration depth of the thermal wave may be smaller than a thickness of the workpieces 18a, 18b, for example the top sheet 18a. For example, the penetration depth of the thermal wave or the laser pulse is approximately 0.3 mm to 0.5 mm. According to the first embodiment with a single laser pulse, the thermal excitation is transient. In other words, the thermal wave is a transient wave. Transient thermal waves do not substantially interact with defects such as pores in the weld seam 20, 20' or interfaces of the weld seam or workpieces 18a, 18b.

As soon as the excitation beam 28 is switched off and the laser pulse ends again, the thermal excitation also ends. In other words, the thermal excitation decays again. The thermal excitation may therefore be viewed as a pulse both in terms of time and space. The region 30 of the weld seam 20, 20' cools again as the thermal wave propagates into the material of the weld seam 20, 20' and the unmachined workpieces 18, 18b that surrounds the region 30. The rate at which the area 30 cools down again and the rate at which the intensity of the thermal radiation emitted by the weld seam 20, 20' decreases or decays depends on the thermal conductivity of the material of the weld seam 20, 20'.

In the case of FIG. 3B, the weld seam 20 includes the copper-aluminum mixed crystal. Its thermal conductivity is relatively low, at least lower than the thermal conductivity of the unmachined material of the top sheet 18a, which essentially consists of copper. The thermal radiation emitted by the heated material of the weld seam 20' in or in the vicinity of the region 30 thus decays more slowly for the weld seam 20' shown in FIG. 3C, which consists essentially of the material of the surrounding unmachined top plate 18a. In order to determine the rate at which the thermal excitation in the region 30 decays, the decay characteristic of the thermal radiation emitted by the weld seam surface is acquired in step S2. The decay characteristic of the thermal radiation emitted by the weld seam 20, 20' is a measure of the decay characteristic of the thermal excitation in the region 30 of the weld seam 20, 20'.

The decay characteristic of the emitted thermal radiation can be acquired, for example, at a point on the weld seam surface in or near the region 30 of the weld seam 20, 20'. According to embodiments, the decay characteristic is acquired by means of a photodiode sensitive in the IR wavelength range and then evaluated. The photodiode captures measurement signals from the point or region of the weld seam surface. The change in emission or temperature in this region is used for the good/bad evaluation. The evolution of the surface temperature over time, i.e. the dynamics of the pulsed excitation, is used as a measure.

The acquired decay characteristics of the emitted thermal radiation may be evaluated in order to determine the rate at which the thermal excitation within the weld seam 20, 20' decays. Thus, as described above, the material or material properties of the weld seam 20, 20' and, based thereon, a welding error may be determined. The method thus allows for the differentiation or classification into good welds and bad welds.

The decay characteristic may be evaluated using an evaluation of the raw data of the acquired intensity curve or the measurement signal of the photodiode. According to embodiments of the method, the evaluation of the decay characteristic may also comprise forming the first time derivation of the intensity curve or of the measurement signal and the evaluation of the derivation. This allows for the differences in the decay characteristics of the two cases discussed above to be distinguished more clearly. This is described in detail below with reference to FIG. 4.

Additionally or alternatively, the measurement signal may be fitted with an analytical one-dimensional diffusion equation or curve and then the first time derivative of this fitted curve may be formed. As a result, the noise of the measurement signal output by the photodiode can be reduced.

Figure 4:
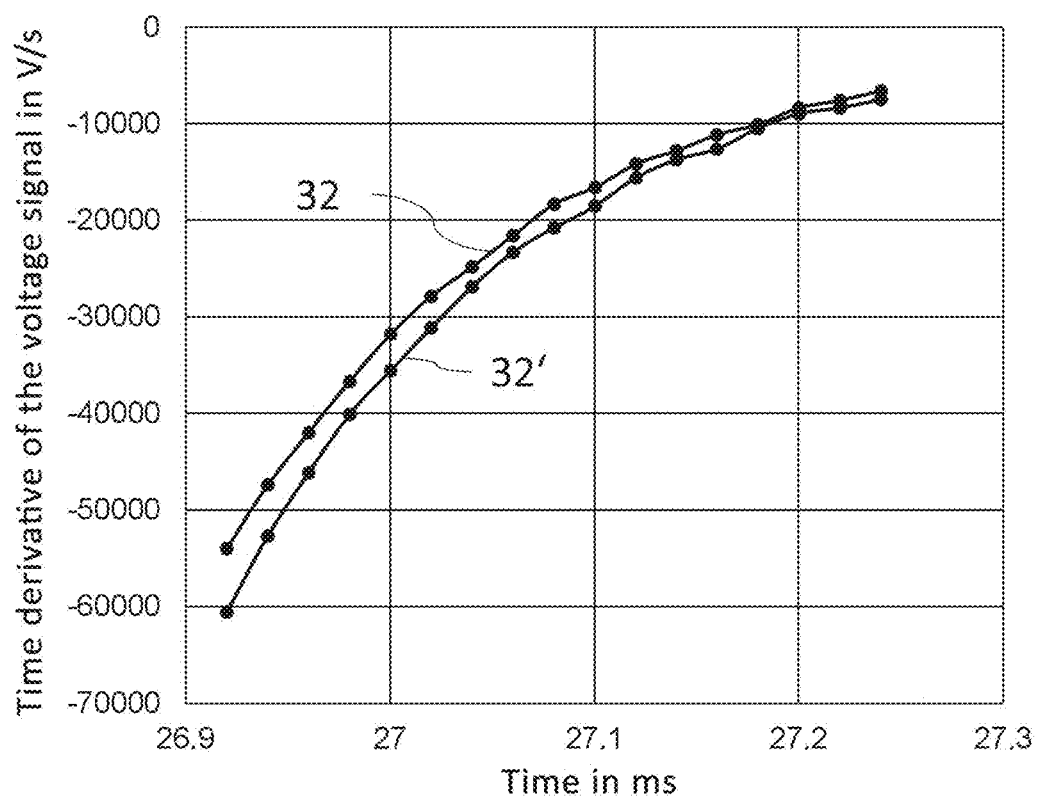
FIG. 4 shows a graph illustrating the first time derivation of the intensity curve of the temperature radiation emitted by the weld seams according to FIGS. 3B and 3C.

FIG. 4 shows a diagram illustrating the first time derivation of the intensity curves of the thermal radiation emitted by the weld seams 20, 20' according to FIGS. 3B and 3C.

As described with reference to FIGS. 3A to 3C, the intensity curves of the emitted thermal radiation were acquired using a photodiode after a laser pulse had been radiated onto the weld seams 20, 20'. The photodiode outputs a measurement signal that depends on the intensity of the thermal radiation emitted and is a voltage signal having the unit V. Accordingly, the first time derivative of this voltage signal has the unit V/s. The diagram shown in FIG. 4 shows the time in ms on the abscissa and the value of the time derivative of the voltage signal in V/s on the ordinate.

The curve 32 shows the first time derivation of a measurement signal based on the thermal radiation emitted by the weld seam 20 with electrical connection (FIG. 3B). The curve 32' shows the first time derivation of a measurement signal based on the thermal radiation emitted by the weld seam 20' without electrical connection (FIG. 3C). In FIG. 4, it is apparent that the curve 32 is above the curve 32' at all times and that the curves 32, 32' are negative. On the one hand, this means that the time derivative of both intensity curves is always negative. Thus, the intensity of the thermal radiation and the temperature of the weld seam in the observed area of the weld seam decreases after the laser pulse, i.e. the weld seam cools down after the thermal excitation.

Furthermore, the absolute value of the time derivative in the case of FIG. 3B is at all points in time less than the absolute value of the time derivative in the case of FIG. 3C. The time derivative in the case of FIG. 3B is therefore always greater than the time derivative in the case of FIG. 3C. The intensity of the thermal radiation emitted and the temperature of the weld seam 20 in the case of a good weld (FIG. 3B) therefore decreases more slowly than the intensity of the thermal radiation emitted and the temperature of the weld seam 20 in the case of a bad weld (FIG. 3C). In other words, the surface of the weld seam 20 of FIG. 3B has a slower cooling rate than the surface of the weld seam 20' of FIG. 3C. Accordingly, based on the curves 32, 32', it can be determined that the weld seam 20 has a lower thermal conductivity and/or heat conductivity than the weld seam 20'. Based on the curves 32, 32' for the first time derivation of the acquired intensity curves, the material or material properties of the weld seams 20, 20' can be inferred.

The curve 32 may be used, for example, as a reference derivation for the evaluation of an acquired decay characteristic of the thermal radiation. For example, as described above, the time derivation of the intensity profile of a weld seam to be analyzed may be formed, and it may be determined that there is no welding defect for this weld seam when the profile of the derivation formed substantially coincides with the curve 32, i.e. within a predetermined tolerance range about curve 32. When the curve of the derivation formed is below the curve 32, it can be determined for the weld seam to be analyzed that there is a welding defect.

Alternatively, a single value of the curve 32 at a predetermined time after the end of the laser pulse may be used as a reference value for the derivation of the decay characteristic, and a corresponding value of the derivative for the weld seam to be analyzed may be used with this reference value in order to determine whether a weld defect is present. It may be determined that a welding defect is present when the value of the derivative for the weld seam to be analyzed is less than the predetermined reference value for the derivative or when a magnitude of that value is greater than a magnitude of the predetermined reference value for the derivative.

FIGS. 5A-5D show weld seams analyzed using methods according to embodiments of the present invention. FIGS. 5A-5D each show in the top row ("camera") a camera-recorded plan view of a weld seam that was formed during laser welding of workpieces 18a, 18b in lap joint, with the weld seam having an I-seam geometry. In the middle row ("optical microscope") are microscopic images of sections of the respective weld seams and corresponding schematic diagrams of the sectional views are shown in the bottom row. The workpieces 18a, 18b are each configured as sheets. In this example, the workpiece 18a substantially consists of copper. In this example, the workpiece 18b substantially consists of aluminum.

Figure 5:
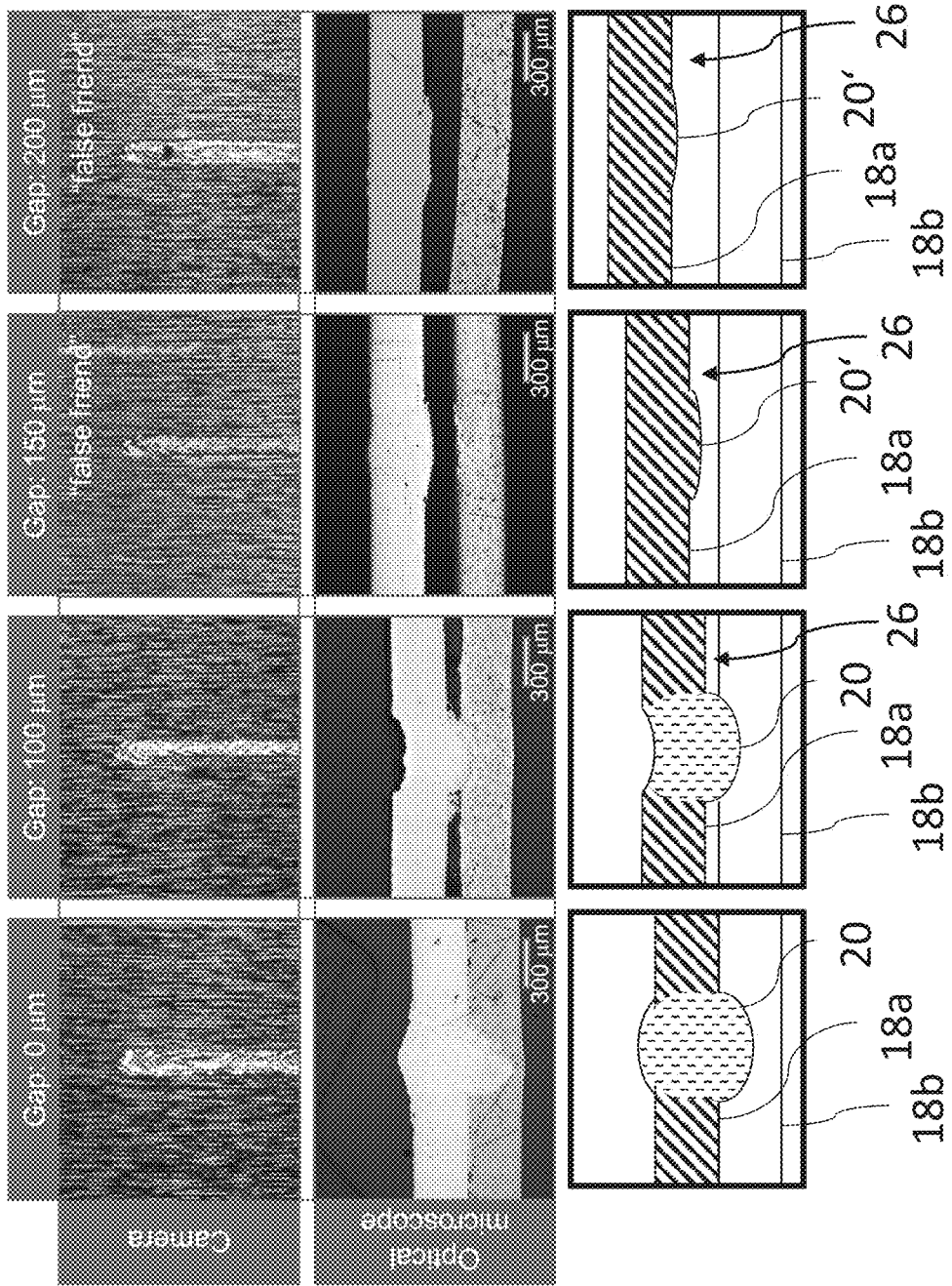
FIGS. 5A-5D show weld seams analyzed using a method according to embodiments of the present invention.

In the plan view of the respective welds, it is not possible to distinguish whether the weld is good or bad. FIGS. 5A and 5B show good welds and FIGS. 5C and 5D illustrate bad welds without connection, i.e. so-called "false friends". The welding defect shown in FIGS. 5C and 5D can be detected quickly, easily and without contact using the method according to embodiments of the present invention.

In the first column ("gap: 0 µm"), FIG. 5A shows a gap-free weld seam 20 through which current can flow. Thus, there is no gap between the welded workpieces 18a, 18b. Accordingly, this case may be marked as a good weld. The material of the weld seam 20 consists of a copper-aluminum mixed crystal.

In the second column ("gap: 100 µm"), FIG. 5B shows a weld seam 20 with a gap 26 of approximately 100 µm between the two workpieces 18a, 18b. This gap 26 can be tolerated because the gap 26 is bridged by the material of the weld seam 20. Thus, despite the existing gap 26, there is still a weld connection between the workpieces 18a, 18b, in particular an electrical connection. Accordingly, this case can also be marked as a good weld. The material of this weld seam 20 also consists of a copper-aluminum mixed crystal.

FIGS. 5C and 5D show the defect pattern of the so-called "false friend" in the third and fourth columns ("Gap: 150 µm" and "Gap: 200 µm"). There is a gap 26 of 150 µm or 200 µm between the workpieces 18a, 18b, which is not bridged. There is therefore no structural or electrical connection between the workpieces 18a, 18b so that a welding defect is present. Accordingly, these cases can be marked as bad welds. In both cases, the material of the weld seam 20' essentially consists of copper.

Figure 6:
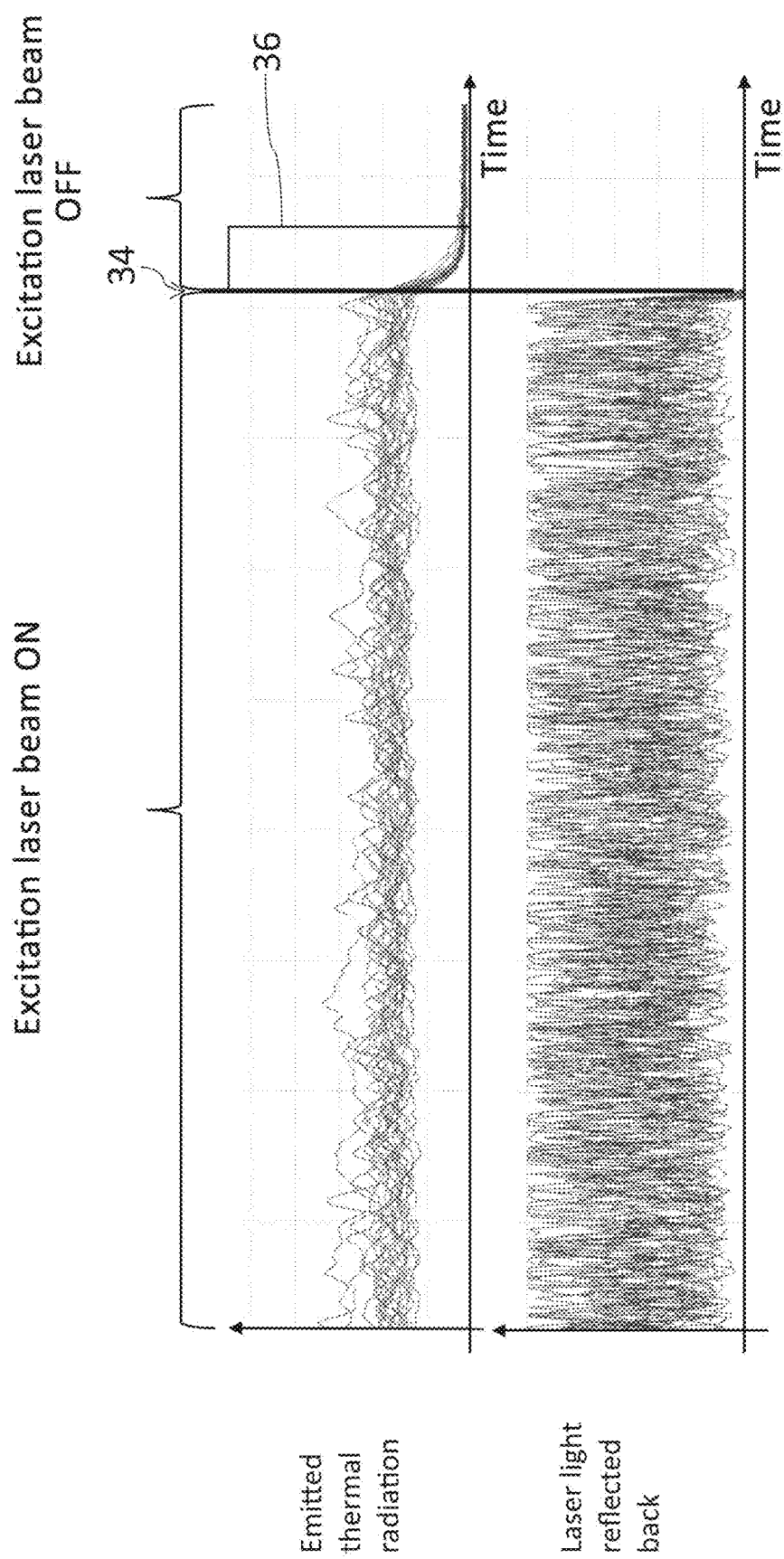
FIG. 6 shows the intensity curve of thermal radiation at the top and an intensity curve of laser light reflected back at the bottom, both of which are obtained in methods according to embodiments.

FIG. 6 shows the intensity curve of thermal radiation emitted by a weld seam at the top and the intensity curve of laser light reflected back from the weld seam at the bottom. The curves may be obtained with the method according to embodiments. The abscissa of the graphs shown in FIG. 6 denotes time. The ordinates of the graphs indicate the respective measured intensities. In the graphs of FIG. 6, a plurality of acquired curves are shown superimposed.

The intensity of the thermal radiation emitted and the intensity of the laser light reflected back may be measured by corresponding photodiodes sensitive in the corresponding wavelength ranges. The photodiodes may be part of the sensor module 14 described with reference to FIGS. 1A and 1B.

The lower diagram shows the intensity curve of the laser light reflected back from a weld seam when the laser pulse of an excitation beam is radiated in. The excitation laser beam is switched on in the left area of the diagram and is radiated onto the weld seam. The intensity of the laser light reflected back therefrom is relatively high. The time 34 at which the intensity of the reflected laser light falls below a predetermined threshold value is marked in the diagram. According to embodiments, this time 34 may be considered or defined as the end or the end time 34 of the laser pulse or of the thermal excitation.

The intensity curve of the thermal radiation emitted by the weld seam is shown in the upper diagram. According to embodiments, measuring the intensity of the thermal radiation and thus acquiring the decay characteristic of the thermal radiation may begin immediately at or after the end 34 of the laser pulse. As FIG. 6 shows, the measurement of the intensity of the temperature radiation may already begin during the laser pulse, i.e. before the end of the laser pulse. The evaluation of the decay characteristic is carried out for data recorded at the end time 34 of the laser pulse or thereafter.

In any case, the so-called "region of interest" (ROI) 36 of the intensity curve of the emitted thermal radiation is to be acquired. The ROI 36 denotes a period of time that is essential for evaluating the decay characteristic of the thermal radiation and determining whether a weld defect is present. In other words, the ROI 36 corresponds to a period of time during which the decay characteristic of the thermal radiation of a weld seam free of defects differs significantly from the decay characteristic of the thermal radiation of a weld seam with a welding defect. This makes it possible to more reliably determine whether a welding defect is present. The ROI 36 preferably begins at or immediately after the end time 34 of the laser pulse. The length of the ROI 36 may be determined experimentally, for example.

FIGS. 7A-7D show diagrams with intensity curves of thermal radiation which was emitted from the weld seams shown in FIGS. 5A-5D. The intensity curves were acquired for the weld seams shown in FIGS. 5A-5D as explained with regard to FIG. 6. The measurement of the intensity of the thermal radiation has therefore already started during the laser pulse, i.e. before the end 34 of the laser pulse, and lasted until after the end of the ROI 36.

As shown in FIGS. 7A-7D, the decay characteristic of the thermal radiation emitted depends on the material or the material properties of the corresponding weld seam. The decay characteristics are therefore different depending on the microstructure formed in the weld seam. Accordingly, based on the acquired intensity curve of the thermal radiation emitted by the weld seam surface, it can be determined whether there is a welding defect. Furthermore, material properties or material parameters may be determined.

Figure 8C:
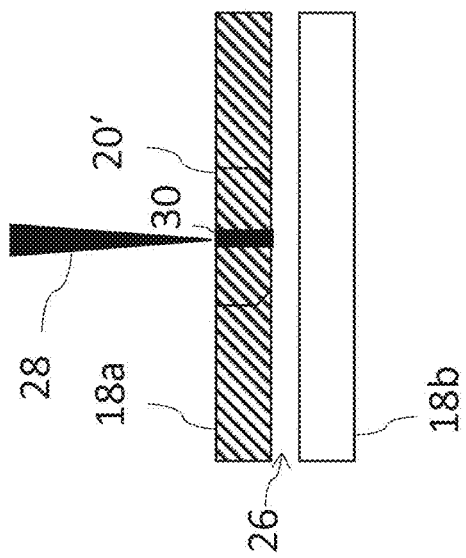
FIGS. 8B and 8C show schematic cross sections of welded workpieces and weld seams for illustrating a method for analyzing a weld seam according to a second embodiment of the invention.
Figure 8B:
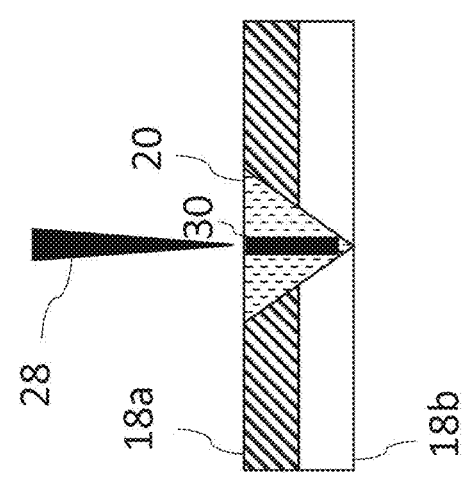
Figure 8A:
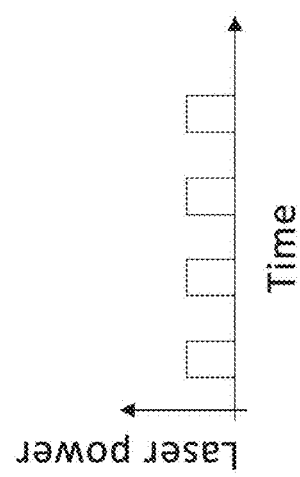
FIG. 8A schematically shows a laser pulse of an excitation beam.

FIG. 8A schematically shows a laser pulse of an excitation laser beam, and FIGS. 8B and 8C show schematic cross sections of welded workpieces and weld seams for illustrating a method of analyzing a weld seam according to a second embodiment of the invention.

In order to explain the method according to the second embodiment, the example of battery module production, as discussed with reference to FIGS. 3A-3C, is used again. A detailed description is therefore omitted here.

According to the second embodiment, in step S1, a plurality of laser pulses of the excitation laser beam 28, i.e. a pulse sequence, are radiated onto the weld seam 20, 20'. In other words, the excitation laser beam 28 may be modulated periodically. FIG. 8A schematically shows the profile of the laser power of the laser pulses or of the excitation laser beam 28. As shown, the laser pulses are substantially rectangular and are repeated periodically. According to further embodiments not shown, the plurality of laser pulses may be modulated sinusoidally.

Accordingly, the thermal excitation of the weld seam 20, 20' is also periodically modulated. A thermal wave is generated in the weld seam by radiating in the plurality of laser pulses or the periodically modulated excitation laser beam. The penetration depth of the thermal wave is illustrated by region 30 in FIGS. 8B and 8C. According to the second embodiment, the penetration depth may be greater than in the case of the first embodiment due to the plurality of laser pulses and the associated repeated thermal excitation. For example, according to the second embodiment, the penetration depth of the thermal wave may be equal to or greater than a thickness of at least one of the workpieces 18a, 18b, for example the top sheet 18a. According to the second embodiment, the thermal excitation is not transient but stationary. The thermal wave is therefore a stationary wave. Stationary thermal waves can interact with defects such as pores in the weld seam 20, 20' or with interfaces between the weld seam 20, 20' and the workpieces 18*a*, 18*b*. This may cause thermal wave interference.

According to the second embodiment, the detection of the intensity or the intensity curve of the thermal radiation emitted by the weld seam surface may begin before the end of the pulse sequence, i.e. before the end of the last pulse in the pulse sequence, or at the same time as the pulse sequence or the periodically modulated excitation beam 26 is radiated in. As in the method according to the first embodiment, the decay characteristic of the thermal radiation is acquired in step S2 after the end of the pulse sequence, i.e. after the end of the last pulse in the pulse sequence.

Based on an evaluation of the acquired decay characteristic, it is then determined whether there is a welding defect (S3). Step S3 is performed as in the method according to the first embodiment, so a detailed description thereof is omitted here.

In the method according to the second embodiment, the intensity curve of the thermal radiation emitted by the weld seam 20, 20', which was acquired during the pulse sequence, may also be evaluated, for example by Fourier transformation. As a result, a phase and/or amplitude response to the thermal excitation by the pulse sequence or the periodically modulated excitation beam may be determined. Furthermore, the evaluation may be based on or include lock-in thermography or pulse-phase technology. Based on the phase and/or amplitude response, for example, pores and interfaces present in the weld seam 20, 20' and interfaces between the weld seam 20, 20' and the adjacent material of the workpieces 18*a*, 18*b* may be inferred.

By means of the method according to the first and second embodiments, a weld seam may be analyzed based on the evaluation of the acquired decay characteristic, in particular based on the evaluation of the intensity or the intensity curve of the thermal radiation emitted by the weld seam after the end of a laser pulse or a pulse sequence.

With the aid of the method according to the second embodiment, defects, for example pores and interfaces, may also be detected based on the evaluation of the intensity or the intensity profile of the thermal radiation emitted by the weld seam during a pulse sequence.

With the aid of methods for analyzing a weld seam formed by a laser welding process according to embodiments, the quality control of a laser-welded weld seam, in particular a contact seam, can therefore be carried out quickly, easily, reliably and without contact. The method is based on the principle of using at least one laser pulse to induce a thermal wave or thermal excitation in the weld seam and to acquire and evaluate decay characteristics thereof. Thus, the thermal behavior of the weld seam is evaluated after the at least one laser pulse. In particular, a time profile of a temperature of the weld seam surface, i.e. a time profile of the intensity of the thermal radiation emitted by the weld seam, may be acquired and evaluated after the energy input by the laser pulse. Alternatively, only a value of the intensity of the thermal radiation emitted by the weld seam may be acquired and evaluated at a specific time after the energy input by the laser pulse. By means of the evaluation, information about a thermal conductivity of the weld can be obtained. Based thereon, it may be determined whether there is a welding defect, in particular a missing (electrical) connection between welded workpieces. Methods according to embodiments may be carried out as inline post-process methods immediately after a laser welding process or as post-process methods.

The methods for analyzing a weld seam formed by a laser welding process according to embodiments may be used in particular for analyzing a weld connection or a contact between conductors of pouch battery cells. However, the present disclosure is not limited thereto. The methods may be applied to any type of battery contact, including prismatic and cylindrical battery cells, for example. Furthermore, the methods may be applied to any type of workpieces in lap joint, in particular with an I-seam geometry, regardless of the type of material and the thickness of the workpieces.

The invention claimed is:

1. A method for analyzing a weld seam formed by a laser welding process, said method comprising:
   thermally exciting said weld seam by radiating at least one laser pulse onto said weld seam;
   acquiring a decay characteristic of a thermal radiation emitted by said weld seam; and
   determining, by a control device connected to a sensor module, based on an evaluation of the acquired decay characteristic, whether a welding defect is present,
   wherein radiating the at least one laser pulse comprises radiating a laser pulse sequence and wherein an intensity profile of the thermal radiation emitted is acquired after the end of the laser pulse sequence.

2. The method according to claim 1, wherein the welding defect comprises at least one of the following: a missing weld connection between workpieces welded by means of said weld seam and a gap between said workpieces.

3. The method according to claim 1, wherein the decay characteristic is acquired immediately after the end of the laser pulse.

4. The method according to claim 3, wherein the end of the laser pulse is determined based on laser light reflected back from the weld seam.

5. The method according to claim 1, wherein the decay characteristic of the thermal radiation emitted is acquired by means of a photodiode.

6. The method according to claim 1, wherein the evaluation of the decay characteristic further comprises determining a time derivative of the decay characteristic.

7. The method according to claim 1, wherein determining whether a welding defect is present comprises comparing the acquired decay characteristic with a predetermined reference decay characteristic.

8. The method according to claim 1, wherein the radiating comprises radiating a plurality of laser pulses comprising radiating a periodically modulated laser beam or radiating a sinusoidally modulated laser beam.

9. The method according to claim 1, wherein, when a plurality of laser pulses are radiated, an intensity profile of the emitted thermal radiation is acquired and, based thereon, a phase response or an amplitude response is determined by means of Fourier transformation in order to detect defects in said weld seam.

10. The method according to claim 1, further comprising forming said weld seam for welding at least two workpieces by radiating a laser beam, wherein the at least two workpieces are arranged in a lap joint or in a parallel joint.

11. The method according to claim 10, wherein one of the at least two workpieces comprises copper or nickel-plated copper and another of the at least two workpieces comprises aluminum.

12. The method according to claim 10, wherein the at least two workpieces consist of different materials and the thermal conductivity of at least one of the at least two workpieces is different from the thermal conductivity of a mixture of different materials created during formation of said weld seam.

13. The method according to claim 10, wherein the at least two workpieces comprise a conductor or a terminal of a battery cell, a battery and/or a battery pack.

14. A laser machining system for analyzing a weld seam formed by a laser welding process, comprising:
- a laser machining head configured to radiate a laser beam onto at least one workpiece for forming said weld seam and to radiate at least one laser pulse sequence onto the weld seam for thermal excitation of the weld seam;
- a sensor module configured to detect a thermal radiation emitted by the weld seam; and
- a control device connected to the sensor module and configured to determine whether a welding defect is present based on a decay characteristic of the thermal radiation emitted by said weld seam,
- wherein an intensity profile of the thermal radiation emitted is acquired after an end of the at least one laser pulse sequence.

15. A method for analyzing a weld seam formed by a laser welding process, said method comprising:
- thermally exciting said weld seam by radiating at least one laser pulse onto said weld seam;
- acquiring a decay characteristic of a thermal radiation emitted by said weld seam;
- determining, by a control device, based on an evaluation of the acquired decay characteristic, whether a welding defect is present; and
- further comprising forming said weld seam for welding at least two workpieces by radiating a laser beam,
- wherein the at least two workpieces comprise a conductor or a terminal of a battery cell, a battery or a battery pack.

16. The laser machining system according to claim 14, wherein the determination, whether a welding defect is present, includes: comparing the acquired decay characteristic to a predetermined reference decay characteristic, wherein the reference decay characteristic corresponds to a decay characteristic of a weld free of defects.

* * * * *